(12) United States Patent
Oriani et al.

(10) Patent No.: US 6,906,137 B2
(45) Date of Patent: Jun. 14, 2005

(54) PROCESS AID MASTERBATCH FOR MELT PROCESSABLE POLYMERS

(75) Inventors: Steven Richard Oriani, Landenberg, PA (US); Salvatore D'Uva, Brantford, CA (US); Viraj Pramod Trilokekar, Oakville, CA (US)

(73) Assignees: DuPont Dow Elastomers LLC, Wilmington, DE (US); Ingenia Polymers Corporation, Toronto (CA)

( * ) Notice: Subject to any disclaimer, the term of this patent is extended or adjusted under 35 U.S.C. 154(b) by 0 days.

(21) Appl. No.: 10/761,548

(22) Filed: Jan. 21, 2004

(65) Prior Publication Data

US 2004/0192818 A1 Sep. 30, 2004

Related U.S. Application Data

(60) Provisional application No. 60/457,698, filed on Mar. 26, 2003.

(51) Int. Cl.⁷ ............................................. C08L 67/02
(52) U.S. Cl. ...................... 525/165; 525/178; 525/199
(58) Field of Search .................... 525/165, 199, 525/178

(56) References Cited

U.S. PATENT DOCUMENTS

| | | | |
|---|---|---|---|
| 4,829,116 A | | 5/1989 | Piesold |
| 5,070,129 A | | 12/1991 | Bailey |
| 5,132,368 A | * | 7/1992 | Chapman et al. ............ 525/165 |
| 5,344,737 A | * | 9/1994 | Berkes et al. ............. 430/108.8 |
| 5,439,628 A | | 8/1995 | Huang |
| 5,707,569 A | * | 1/1998 | Priester et al. ................. 264/39 |
| 6,734,252 B1 | * | 5/2004 | Woods ........................ 525/187 |
| 2003/0100680 A1 | * | 5/2003 | Oriani ......................... 525/199 |

OTHER PUBLICATIONS

E. C. Achilleos G. Georgiou, and S. G. Hatzikiriakos, Role of Processing Aids in the Extrusion of Molten Polymers, Journal of Vinyl & Additive Technology, Mar. 2002, pp. 7–24, vol. 8, No. 1.

Bruce V. Johnson and Joyce M. Kunde, Polyolefin Processing Aid Versus Additive Package?, Plastics Engineering, Jul. 1988, pp. 43–46.

Dr. Hans Zweifel, Plastics Additives Handbook, 2001, pp. 552–584.

John Horns and Eric Adair, The Effect Fluoropolymer Processing Additives and Stearate Additives Level have on Processing of HDPE Resins, 2000 TAPPI Polymers, Laminations, & Coatings Conference, pp. 1087–1096.

* cited by examiner

*Primary Examiner*—David W. Wu
*Assistant Examiner*—Henry S. Hu

(57) ABSTRACT

A process aid masterbatch comprising a) 0.05 to 25 weight percent fluoropolymer; b) 0.2 to 10 weight percent of an organic soap selected from the group consisting of carboxylic acids having from 6 to 34 carbon atoms; salts thereof; hydrocarbon sulfonates having from 6 to 34 carbon atoms; and salts thereof; c) at least 5 weight percent mineral particulate; and d) a non-fluorinated melt-processable polymer improves the extrusion processability of non-fluorinated melt-processable polymers.

7 Claims, No Drawings

PROCESS AID MASTERBATCH FOR MELT PROCESSABLE POLYMERS

CROSS-REFERENCE TO RELATED APPLICATIONS

This application claims the benefit of U.S. Provisional Application No. 60/457,698 filed Mar. 26, 2003.

FIELD OF THE INVENTION

The present invention relates to a process aid masterbatch for the improvement of extrusion processability of non-fluorinated melt-processable polymers; more particularly, a masterbatch composition comprising fluoropolymer process aid, an organic soap, mineral particulate, and a non-fluorinated melt-processable polymer.

BACKGROUND OF THE INVENTION

The melt extrusion of high molecular weight polymers, for example, hydrocarbon polymers and polyamides, into shaped structures such as tubing, pipe, wire coating or film is accomplished by well-known procedures wherein a rotating screw pushes a viscous polymer melt through an extruder barrel into a die in which the polymer is shaped to the desired form and is then subsequently cooled and solidified into a product having the general shape of the die.

In order to achieve low production costs, it is desirable to extrude the polymer at rapid rates. Higher extrusion rates may be readily obtained by increasing the rate of revolution of the extruder screw. However, this technique is subject to limitations imposed by the viscoelastic properties of the polymer substrate. Thus, at very high extrusion rates an unacceptable amount of thermal decomposition of the polymer can result. Further, extrudates having a rough surface are often obtained which can lead to formation of an undesirable pattern on the surface of the extrudate.

It is desirable, therefore, to find highly efficient means of increasing the extrusion rate, while producing articles having smooth surfaces. Conventional wax-type process aids have been found to reduce bulk viscosity and in some cases improve processing properties. However, the efficiency is marginal and the high levels of additive required often adversely affect other properties.

In Blatz, U.S. Pat. No. 3,125,547, it is disclosed that the use of 0.01–2.0 wt. % of a fluorocarbon polymer that is in a fluid state at the process temperature, such as a fluoroelastomer, will reduce die pressure in extrusions of non-fluorinated polymers such as high and low density polyethylenes and other polyolefins. Further, use of this additive allows significant increase in extrusion rates without melt fracture. Fluoropolymer coats the extrusion die, thus improving flow of the polyolefin.

More recently, improved fluoropolymer process aid compositions have been disclosed in for example, U.S. Pat. Nos. 4,855,360; 5,587,429 and 5,707,569. In these fluoropolymer process aid compositions, a second additive, such as a poly(oxyalkylene) or an ionomer resin, is introduced in order to improve extrusion processability of the non-fluorinated polymer.

Various processing aids that are blends of two or more elastomeric or thermoplastic fluoropolymers have been described in the prior art. U.S. Pat. No. 4,904,735 discloses blends of a tetrafluoroethylene homo- or copolymer (which is a solid at the extrusion temperature) with either a fluoroelastomer having a Tg less than the extrusion temperature, or a crystalline fluoropolymer having a melting point below the extrusion temperature. U.S. Pat. No. 5,106,911 discloses blends of a fluoroelastomer and a crystalline vinylidene fluoride homo- or copolymer wherein the latter has a melting point less than the extrusion temperature.

U.S. Pat. Nos. 6,242,548 B1 and 6,277,919 B1 disclose process aids which are multimodal fluoropolymers. The latter process aids may optionally contain a poly(oxyalkylene) polymer.

WO 02/066544 discloses large particle size fluoropolymer process aids which are more effective than finely dispersed fluoropolymers in improving the extrudability of non-fluorinated melt processable polymers.

The effectiveness of all of the preceding process aids may be adversely affected if the extrudable composition of non-fluorinated melt processable polymer contains particulate mineral additives such as antiblocks, pigments and acid scavengers (e.g. $TiO_2$, talc, hydrotalcites, etc.). The fluoropolymer is adsorbed onto the surface of the particulate, and thus is not available for improving the extrudability of the non-fluorinated melt processable polymer. Effectiveness of the fluoropolymer process aid is especially diminished when mineral particulate and fluoropolymer are both present at high concentrations in a masterbatch (or concentrate). Such masterbatches are typically used in the industry for the feeding of fluoropolymer and mineral particulate to the extruder.

SUMMARY OF THE INVENTION

It has been surprisingly discovered that process aid masterbatches that contain an organic soap, in addition to the fluoropolymer process aid and mineral particulate, do not lose effectiveness as process aids to the same degree as do masterbatches not containing the organic soap.

Accordingly, one aspect of the present invention is a process aid masterbatch composition comprising:

A) 0.05 to 25 weight percent, based on total weight of the masterbatch, of a fluoropolymer;

B) 0.2 to 10 weight percent, based on total weight of the masterbatch, of an organic soap selected from the group consisting of carboxylic acids having from 6 to 34 carbon atoms; salts thereof; hydrocarbon sulfonates having from 6 to 34 carbon atoms; and salts thereof;

C) at least 5 weight percent, based on total weight of the masterbatch, of mineral particulate; and D) a non-fluorinated melt processable polymer.

DETAILED DESCRIPTION OF THE INVENTION

The present invention is directed to a process aid masterbatch composition for improving the extrusion processability of non-fluorinated melt processable polymer compositions that contain mineral particulate. The terms "extrusion processability" or "extrudability" as used herein refer to the conditioning time (i.e. the elapsed time between extruder start up when extruded articles exhibit a high degree of melt fracture, and the time when an extrudate has a smooth surface, free of melt fracture). Obviously, in order to minimize waste and reduce costs, a very short conditioning time is desirable. Thus, a decrease in conditioning time results in an improvement in extrusion processability and extrudability.

Examples of non-fluorinated melt processable polymers include, but are not limited to, hydrocarbon resins, polyamides, chlorinated polyethylene, polyvinyl chloride, and polyesters. By the term "non-fluorinated" it is meant that the ratio of fluorine atoms (if any) to carbon atoms present in the polymer is less than 1:1. The non-fluorinated melt-processable polymers of this invention may be selected from a variety of polymer types. Such polymers include hydrocarbon polymers having melt indexes (measured according to ASTM D1238 at 190° C., using a 2160 g weight) of 5.0 g/10 minutes or less, preferably 2.0 g/10 minutes or less. The hydrocarbon polymers may be elastomeric copolymers of ethylene, propylene, and optionally a non-conjugated diene monomer, for example 1,4-hexadiene. In general, hydrocarbon polymers also include any thermoplastic hydrocarbon polymer obtained by the homopolymerization or copolymerization of a monoolefin of the formula $CH_2=CHR$, where R is H or an alkyl radical, usually of not more than eight carbon atoms. In particular, this invention is applicable to polyethylene, of both high density and low density, for example, polyethylenes having a density within the range 0.89 to 0.97 g/cm$^3$; polypropylene; polybutene-1; poly(3-methylbutene); poly(methylpentene); and linear low density copolymers of ethylene and alpha-olefins having more than 2 carbon atoms such as propylene, butene-1, hexene-1, octene-1, decene-1, and octadecene. Hydrocarbon polymers may also include vinyl aromatic polymers such as polystyrene. Because specific hydrocarbon polymers exhibit differing melt characteristics, the practice of this invention may have greater utility in some hydrocarbon polymers than in others. Thus, hydrocarbon polymers such as polypropylene and branched polyethylene that are not of high molecular weight have favorable melt flow characteristics even at lower temperatures, so that surface roughness and other surface defects can be avoided by adjustment of extrusion conditions. These hydrocarbon polymers may only require the use of the fluorocarbon polymer extrusion aid masterbatch compositions of this invention under unusual and exacting extrusion conditions. However, other polymers such as high molecular weight, high density polyethylene, linear low density polyethylene copolymers, high molecular weight polypropylene, and propylene copolymers with other olefins, particularly those with narrow molecular weight distributions, do not permit this degree of freedom in variation of extrusion conditions. It is particularly with these resins that improvements in the surface quality of the extruded product are obtained with the compositions and process of this invention.

Other non-fluorinated melt-processable polymers of this invention include polyamides and polyesters. Specific examples of polyamides useful in the practice of this invention are nylon 6, nylon 6/6, nylon 6/10, nylon 11 and nylon 12. Suitable polyesters include poly(ethylene terephthalate) and poly(butylene terephthalate).

The fluoropolymer component useful in the compositions of this invention may be either thermoplastic fluoropolymer (i.e. a semi-crystalline fluoropolymer), elastomeric fluoropolymer (i.e. amorphous fluoropolymer or fluoroelastomer), or a mixture thereof. Preferably, the fluoropolymers employed in the compositions of this invention have a weight average particle size greater than 2 microns and less than 10 microns, as measured at a point in the extrusion process immediately prior to the die. Means for achieving such particle sizes are disclosed in WO 02/066544.

Semi-crystalline fluoropolymers useful as the sole fluoropolymer in the masterbatch compositions of this invention are those which are molten at the extrusion temperature. If employed in combination with a second semi-crystalline fluoropolymer or with a fluoroelastomer, one semi-crystalline fluoropolymer may be a solid at the extrusion temperature. Specific examples of semi-crystalline fluoropolymers include, but are not limited to PTFE; polyvinylidene fluoride; copolymers of tetrafluoroethylene, hexafluoropropylene and vinylidene fluoride (e.g. THV); and FEP.

Fluoroelastomers useful in this invention are fluoropolymers that are normally in the fluid state at room temperature and above, i.e. fluoropolymers which have values of $T_g$ below room temperature and which exhibit little or no crystallinity at room temperature. It is preferred, but not essential, to employ fluoroelastomers having a fluorine to hydrogen ratio of at least 1:1.5. Fluorinated monomers which may be copolymerized to yield suitable fluoroelastomers include vinylidene fluoride, hexafluoropropylene, chlorotrifluoroethylene, tetrafluoroethylene and perfluoroalkyl perfluorovinyl ethers. Specific examples of the fluoroelastomers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene with propylene or ethylene and, optionally, vinylidene fluoride, all of which are known in the art. In some cases these copolymers may also include bromine-containing comonomers as taught in Apotheker and Krusic, U.S. Pat. No. 4,035,565, or terminal iodo-groups, as taught in U.S. Pat. No. 4,243,770. The latter patent also discloses the use of iodo group-containing fluoroolefin comonomers. When fluorinated monomers are present in these copolymers in certain molar ratios, the glass transition temperature of the polymer is near or below 0° C., and the compositions are useful elastomers that are readily available articles of commerce. Preferably the fluoroelastomers employed in the compositions of this invention contain copolymerized units of i) vinylidene fluoride/hexafluoropropylene; ii) vinylidene fluoride/hexafluoropropylene/tetrafluoroethylene; iii) tetrafluoroethylene/propylene; or iv) tetrafluoroethylene/propylene/vinylidene fluoride. Preferably, at least one fluoroelastomer employed in the compositions of this invention have a Mooney viscosity, ML(1+10) at 121° C. between 60 and 80.

Fluoropolymer employed in this invention may also be bimodal, multimodal, or unimodal mixtures.

The total amount of fluoropolymer contained in the masterbatch compositions of the invention is in the range of 0.05 to 25 (preferably 0.1 to 5) weight percent, based on the total weight of the masterbatch composition.

Masterbatch compositions of the invention also contain at least 5 weight percent, based on the total weight of the masterbatch composition, mineral particulate. Preferably, the compositions contain at least 10 weight percent mineral particulate. By "mineral particulate" is meant finely divided, substantially inorganic material that remains solid at the processing temperature (i.e. extrusion temperature) of the non-fluorinated polymer. Specific examples of mineral particulates include titanium dioxide, talc, amorphous and crystalline silica, hydrotalcites, colored inorganic pigments and calcium salts such as calcium carbonate and calcium sulfate.

Surprisingly, it has been discovered that the effectiveness of the fluoropolymer as a process aid, when in the presence of mineral particulate, may be preserved if the masterbatch composition also contains an organic soap. It is theorized that the organic soap, rather than the fluoropolymer, is preferentially adsorbed onto the surface of the mineral particulate. Organic soaps include carboxylic acids that contain between about 6 and about 34 (preferably 12 to 28) carbon atoms and hydrocarbon sulfates containing between about 6 and about 34 (preferably 12 to 28) carbon atoms. The metal salts of these carboxylic acids and sulfonates are also considered soaps that may be used in the masterbatch compositions of this invention. Specific examples of soaps which may be employed in this invention include, but are not limited to stearic acid, zinc stearate, calcium stearate, magnesium stearate, montanic acid and its metal salts. Organic soap level is between 0.2 and 10 (preferably 0.5 to 5) weight percent, based on the total weight of the masterbatch compositions.

A process suitable for making the masterbatch compositions of this invention is one in which the fluoropolymer, soap, mineral particulate and non-fluorinated melt processable polymer are all mixed together simultaneously. Suitable mixers include an extruder, a compounding mill and an internal mixer (e.g. a Banbury). It is not necessary that the same non-fluorinated melt processable polymer be employed in the masterbatch compositions as will be employed as the major component in the extrudable compositions from which the end user will make blown films, wire and cable jacketing, etc.

Another process suitable for making the masterbatch composition of the invention is one in which the organic soap and mineral particulate are first mixed together and then fluoropolymer and non-fluorinated melt processable polymer are added together or separately.

Optionally, the masterbatch compositions of this invention may contain an interfacial agent. Examples of interfacial agents include, but are not limited to i) silicone-polyether copolymers; ii) aliphatic polyesters such as poly (butylene adipate), poly(lactic acid) and polycaprolactone polyesters; iii) aromatic polyesters such as phthalic acid diisobutyl ester; iv) polyether polyols such as poly (tetramethylene ether glycol); v) amine oxides such as octyldimethyl amine oxide; vi) carboxylic acids such as hydroxy-butanedioic acid; vii) fatty acid esters such as sorbitan monolaurate and triglycerides; and viii) poly (oxyalkylene) polymers. As used herein, the term "poly (oxyalkylene) polymers" refers to those polymers and their derivatives that are defined in U.S. Pat. No. 4,855,360. Such polymers include polyethylene glycols and their derivatives (e.g. Carbowax™ PEG 8000 and Polyvox™ WSR N-10). A preferred aliphatic polyester interfacial agent is a polycaprolactone diol having a number average molecular weight in the range 1000 to 32000, preferably 2000 to 10000, and most preferably 2000 to 4000. When present, the weight ratio of interfacial agent to total fluoroelastomers in the extrudable compositions is typically between 5:1 to 1:2.

The masterbatch compositions of the invention are particularly useful in forming extrudable compositions of non-fluorinated melt processable polymers, particularly polyolefins. Such extrudable compositions are commonly used in manufacture of blown films and wire and cable jacketing.

EXAMPLES

The following examples illustrate the significant improvement in extrusion processability, as evidenced by shorter conditioning times, when masterbatches of the invention are employed to make extrudable compositions that contain mineral particulate.

The materials employed in these examples were as follows:

The non-fluorinated melt processable polymer was a high molecular weight linear low density polyethylene, i.e. a linear low density (d=0.918 g/cc) copolymer of ethylene and 1-butene having a melt index (ASTM D-1238, condition E) of 1.0 (hereinafter referred to as "LLDPE"). A granular form of LLDPE was employed to make the masterbatch compositions, whereas a pelletized version was used as the major ingredient in extrudable compositions.

Process aids PPA-1 and PPA-2 both contained a vinylidene fluoride-hexafluoropropylene fluoroelastomer, an interfacial agent and small amounts of the partitioning agents talc and calcium carbonate. The fluoroelastomer had a Mooney viscosity ML(1+10) at 121° C. (measured per ASTM D-1646, large rotor) of 70. PPA-1 contained 52 wt. % fluoroelastomer, 42 wt. % polyethylene glycol having an Mn of 8000 as the interfacial agent, and 6 wt. % mineral partitioning agent. PPA-2 contained 32 wt. % fluoroelastomer, 64 wt. % polycaprolactone diol having an Mn of 4000 as the interfacial agent, and 4 wt. % mineral partitioning agent.

Masterbatch compositions were made by first tumble blending the ingredients and then compounding the masterbatches in a 28 mm co-rotating W&P twin screw, operating at 300 revolutions per minute (rpm) and at set temperatures of 200° C., and extruding into pellets.

Extrudable compositions were made by letting down the masterbatch pellets in LLDPE on a blown film line. For each masterbatch composition tested, the time until melt fracture was eliminated from extruded film, or the remaining percentage of melt fracture at the end of the run time, was recorded.

Comparative Example 1

In this comparative example, control masterbatch compositions were made that did not contain added mineral particulate. The formulations of the control masterbatches are shown in Table I. Percentages are percent by weight, based on the total weight of the composition. For simplicity, the amounts of LLDPE required to make up 100% in each of the masterbatch compositions are omitted from the Table. Stearates or stearic acid, as indicated in the Table, were employed as the organic soap.

TABLE I

| Masterbatch, wt. % | PPA-1 | PPA-2 | Zinc Stearate | Calcium Stearate | Stearic Acid |
|---|---|---|---|---|---|
| MB-A | 1.923 | 0 | 0 | 0 | 0 |
| MB-B | 0 | 1.923 | 0 | 0 | 0 |
| MB-C | 1.923 | 0 | 1.0 | 0 | 0 |
| MB-D | 0 | 1.923 | 1.0 | 0 | 0 |
| MB-E | 1.923 | 0 | 0 | 1.0 | 0 |
| MB-F | 0 | 1.923 | 0 | 1.0 | 0 |
| MB-G | 1.923 | 0 | 0 | 0 | 1.0 |
| MB-H | 0 | 1.923 | 0 | 0 | 1.0 |

Extrudable compositions (Samples 1–8) were prepared by letting down the individual masterbatches in LLDPE to result in extrudable compositions containing 480 ppm process aid and, where present, 250 ppm organic soap.

Blown films 25 microns in thickness were produced from these compositions using a 2.5 inch (0.98 cm) 24:1 L/D extruder equipped with a 4 inch (1.58 cm) blown film die having a 0.030 inch (0.12 mm) gap. Barrel zone temperatures (starting at the feed section) were 160° C., 180° C., 194° C., and 190° C., with adapter and die temperatures of 200° C. Melt temperature for each run was 212° to 214° C., and the die pressure at the start of each run was in the range of 27.7 to 28.3 MPa. The screw was a conventional design with a barrier flight, operating at 40 rpm. Extruder output at the start of each run was 45.4 kg/hour, resulting in apparent shear rates in the die gap of approximately 500 sec$^{-1}$.

Prior to each test run, the extruder and die were purged with a masterbatch containing 30% silica (diatomaceous earth) in order to remove the fluoroelastomer from the previous test. After purging the silica masterbatch from the extruder with LLDPE, blown film was produced using 100% LLDPE for 10 minutes to ensure that each test began with 100% melt fracture.

When the extrudable composition being tested dropped into the feed throat of the extruder, a digital timer with a one second readout was started. The melt fracture removal performance of each extrudable composition was monitored by continuous visual observation of the roughness of the melt exiting the die and of the blown film. When no melt fracture was visible in this manner, the digital timer was stopped, and a film sample was taken for inspection to ensure that the melt fracture was completely eliminated. If the melt fracture was completely removed, the conditioning time was recorded as the time registering on the digital timer. When melt fracture was still present after 60 minutes of running time, a film sample was taken, and the test was terminated.

The results of these tests are shown in Table II. In the absence of mineral particulates, the presence of organic soaps in masterbatch compositions had little effect on extrudability (as measured by conditioning time) of films. In fact, masterbatches containing PPA-2 actually extruded slightly worse (longer conditioning time) when organic soap was present. The latter is shown by comparing the conditioning times of Sample 2 with Samples 4, 6 and 8.

TABLE II

| Extrudable Composition | Masterbatch | Conditioning Time, minutes |
|---|---|---|
| Sample 1 | MB-A | 27 |
| Sample 2 | MB-B | 10 |
| Sample 3 | MB-C | 25 |
| Sample 4 | MB-D | 18 |
| Sample 5 | MB-E | 27 |
| Sample 6 | MB-F | 27 |
| Sample 7 | MB-G | 22 |
| Sample 8 | MB-H | 14 |

Example 1

In this example, the experiments of Comparative Example 1 were repeated except that masterbatches also contained mineral particulate (TiO$_2$, R-104 available from DuPont). Thus, masterbatches containing organic soap (MB-1 to MB-6) are masterbatches of the invention. Masterbatch formulations are shown in Table III.

TABLE III

| Masterbatch, wt. % | PPA-1 | PPA-2 | Zinc Stearate | Calcium Stearate | Stearic Acid | TiO$_2$ |
|---|---|---|---|---|---|---|
| MB-I | 1.923 | 0 | 0 | 0 | 0 | 20 |
| MB-J | 0 | 1.923 | 0 | 0 | 0 | 20 |
| MB-1 | 1.93 | 0 | 1.0 | 0 | 0 | 20 |
| MB-2 | 0 | 1.923 | 1.0 | 0 | 0 | 20 |
| MB-3 | 1.923 | 0 | 0 | 1.0 | 0 | 20 |
| MB-4 | 0 | 1.923 | 0 | 1.0 | 0 | 20 |
| MB-5 | 1.923 | 0 | 0 | 0 | 1.0 | 20 |
| MB-6 | 0 | 1.923 | 0 | 0 | 1.0 | 20 |

Conditioning times for extrudable compositions containing 480 ppm fluoroelastomer, 5000 ppm TiO$_2$ and 250 ppm stearate or stearic acid (except control of 0 ppm stearate) are shown in Table IV. The surprising ability of masterbatches containing organic soap to ameliorate the negative effect on extrudability of mineral particulates is clearly seen in the conditioning times, especially when the soap was zinc stearate or stearic acid and the fluoropolymer was PPA-1 (80 minutes for no organic soap present in the masterbatch, vs. 20 and 30 minutes for zinc stearate and stearic acid respectively).

TABLE IV

| Extrudable Composition | Masterbatch | Conditioning Time, minutes |
|---|---|---|
| Sample 9 | MB-I | 80 |
| Sample 10 | MB-J | 52 |
| Sample 11 | MB-1 | 20 |
| Sample 12 | MB-2 | 30 |
| Sample 13 | MB-3 | 40 |
| Sample 14 | MB-4 | 55 |
| Sample 15 | MB-5 | 30 |
| Sample 16 | MB-6 | 30 |

Example 2

The effect on extrudability of zinc stearate organic soap level and method of addition of the soap to the extruder was determined in this example.

Masterbatches were made according to the method described in Example 1. The formulations are shown in Table V. Masterbatches MB-7 through MB-10 were compositions of the invention. Control masterbatches MB-K through MB-N were made to compare with the effectiveness of masterbatches of the invention when used to improve the processing performance of extrudable compositions.

TABLE V

| Masterbatch, wt. % | PPA-1 | Zinc Stearate | TiO$_2$ |
|---|---|---|---|
| MB-K | 1.923 | 0 | 20 |
| MB-L | 1.923 | 0 | 0 |
| MB-M | 0 | 0 | 20 |
| MB-N | 0 | 0.2 | 0 |
| MB-7 | 1.923 | 0.2 | 20 |
| MB-8 | 1.923 | 0.5 | 20 |
| MB-9 | 1.923 | 1.0 | 20 |
| MB-10 | 1.923 | 4.0 | 20 |

Extrudable compositions were made generally according to the method described in Example 1 and the conditioning times were measured. All of the extrudable compositions contained 480 ppm PPA-1 and 5000 ppm TiO$_2$. Formulations and conditioning times are shown in Table VI. Comparing the conditioning times of Samples 17 (made from a control masterbatch that contained process aid and mineral particulate, but no zinc stearate) with that of Samples 21–23 (made from masterbatch compositions of the invention), one sees that masterbatches of the invention improve the extrudability by shortening the conditioning time from 80 minutes to between 30 and 10 minutes. The higher the level of stearate in the masterbatch, the shorter the conditioning time.

Extrudable composition Sample 18 was made by metering two separate masterbatches to the blown film extruder, one of process aid in non-fluorinated melt processable polymer (MB-L) and one of $TiO_2$ in non-fluorinated melt processable polymer (MB-M). The conditioning time was 25 minutes, indicating that dilute mineral particulate in the extrudable composition does not adversely affect the performance of the fluoropolymer process aid to the degree that high concentrations of mineral particulate do when present in the masterbatch with the fluoropolymer (Sample 17, 80 minutes).

Comparing the conditioning times of extrudable compositions, Sample 19 (50 minutes) and Sample 20 (30 minutes), demonstrates the importance of having the stearate in the masterbatch that contains the process aid and $TiO_2$ (Sample 20, made from MB-7), rather than adding the stearate to the extruder separately (Sample 19, made from control masterbatches MB-K and MB-N).

TABLE VI

| Extrudable Composition | Masterbatch | Zinc Stearate, ppm | Conditioning Time, minutes |
|---|---|---|---|
| Sample 17 | MB-K | 0 | 80 |
| Sample 18 | MB-L, MB-M | 0 | 25 |
| Sample 19 | MB-K, MB-N | 50 | 50 |
| Sample 20 | MB-7 | 50 | 30 |
| Sample 21 | MB-8 | 125 | 20 |
| Sample 22 | MB-9 | 250 | 20 |
| Sample 23 | MB-10 | 500 | 10 |

Example 3

The adverse effect of the mineral particulate talc on the efficiency of fluoropolymer process aids and the improvement in efficiency due to the presence of an organic soap in the masterbatch was determined in this example.

Masterbatch compositions were made generally according to the method of Example 1 except that talc (ABT2500, available from Specialty Minerals Corp.) was used in place of $TiO_2$. The formulations are shown in Table VII.

TABLE VII

| Masterbatch, wt. % | PPA-1 | Zinc Stearate | Talc |
|---|---|---|---|
| MB-O | 1.923 | 0 | 20 |
| MB-11 | 1.923 | 4.0 | 20 |

Extrudable compositions were made generally according to the method described in Example 1 and the conditioning times were measured. All of the extrudable compositions contained 480 ppm PPA-1 and 5000 ppm Talc. Formulations and conditioning times are shown in Table VIII. Addition of zinc stearate to the masterbatch improved the conditioning time from 60 minutes (Sample 24, no zinc stearate in control masterbatch MB-O) with 99% of the original melt fracture still observed in the film, to 28 minutes and no observed melt fracture (Sample 25, with masterbatch MB-11 of the invention).

TABLE VIII

| Extrudable Composition | Masterbatch | Zinc Stearate, ppm | Conditioning Time, minutes |
|---|---|---|---|
| Sample 24 | MB-O | 0 | 60[1] |
| Sample 25 | MB-11 | 1000 | 28 |

[1]Test was stopped after 60 minutes when there was still 99% melt fracture observed in the film.

What is claimed is:

1. A process aid masterbatch composition comprising:

A) 0.05 to 25 weight percent, based on total weight of the masterbatch, of a fluoropolymer;

B) 0.2 to 10 weight percent, based on total weight of the masterbatch, of an organic soap selected from the group consisting of carboxylic acids having from 6 to 34 carbon atoms; salts thereof; hydrocarbon sulfonates having from 6 to 34 carbon atoms; and salts thereof;

C) at least 5 weight percent, based on total weight of the masterbatch, of mineral particulate; and D) a non-fluorinated melt processable polymer.

2. The composition of claim 1 wherein said fluoropolymer is a semi-crystalline fluoropolymer.

3. The composition of claim 1 wherein said fluoropolymer is a fluoroelastomer.

4. The composition of claim 1 wherein said non-fluorinated melt processable polymer is selected from the group consisting of i) high density polyethylene; ii) linear low density polyethylene copolymers; iii) low density polyethylene; iv) polypropylene; and v) copolymers of propylene with other olefins.

5. The composition of claim 1 further comprising an interfacial agent selected from the group consisting of i) silicone-polyether copolymers; ii) aliphatic polyesters; iii) aromatic polyesters; iv) polyether polyols; v) amine oxides; vi) fatty acid esters; and vii) poly(oxyalkylene) polymers.

6. The composition of claim 1 wherein said organic soap is selected from the group consisting of carboxylic acids having from 12 to 28 carbon atoms; salts thereof; hydrocarbon sulfonates having from 12 to 28 carbon atoms; and salts thereof.

7. The composition of claim 6 wherein said organic soap is selected from the group consisting of stearic acid, zinc stearate, calcium stearate, magnesium stearate, montanic acid and metal salts of montanic acid.

* * * * *